US006747767B1

(12) United States Patent
Heuer et al.

(10) Patent No.: US 6,747,767 B1
(45) Date of Patent: Jun. 8, 2004

(54) WHITE BALANCING METHOD

(75) Inventors: Axel Heuer, Fahren (DE); Holger Suhr, Kiel (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 09/194,368

(22) PCT Filed: May 15, 1997

(86) PCT No.: PCT/DE97/00981

§ 371 (c)(1), (2), (4) Date: May 21, 1999

(87) PCT Pub. No.: WO97/46003

PCT Pub. Date: Dec. 4, 1997

(30) Foreign Application Priority Data

May 29, 1996 (DE) ........................................ 196 21 458

(51) Int. Cl.[7] ................................................ H04N 1/46

(52) U.S. Cl. ........................ 358/516; 358/500; 358/520

(58) Field of Search ................................ 358/461, 500, 358/516, 520; 382/167, 162, 312

(56) References Cited

U.S. PATENT DOCUMENTS 5,038,216 A * 8/1991 Easterly ...................... 358/228
5,202,773 A * 4/1993 Kato .......................... 358/461
5,251,021 A * 10/1993 Parulski ...................... 358/500
5,414,535 A * 5/1995 Kanmoto .................... 358/487

FOREIGN PATENT DOCUMENTS

| | | | | |
|---|---|---|---|---|
| GB | 2148658 | * | 5/1985 | H04N/1/10 |
| WO | WO 90 13199 | * | 11/1990 | H04N/1/40 |
| WO | WO 92 04799 | * | 3/1992 | H04N/1/46 |
| WO | WO 97/46003 | * | 4/1997 | H04N/1/40 |

* cited by examiner

*Primary Examiner*—Jerome Grant, II
(74) *Attorney, Agent, or Firm*—Schiff Hardin LLP

(57) ABSTRACT

In a method for white balance of an optoelectronic color scanner element of a color scanner device for pixel-by-pixel and line-by-line scanning of a color original rated voltage values are calculated from the optical densities of the white point of the color original and a predetermined white level. Scan light that represents the optical density zero of the color original is simulated with an illumination means and is converted in actual voltage values in a light/voltage transducer means. The gains of the light/voltage transducer unit are set such and held constant for the duration of the following originals' scanning such that the actual voltage values are equal to the calculated rated voltage values, it being thereby achieved that the color signals of the white point correspond to the white level in the later scanning of the original. For light attenuation of the simulated scan light, scan diaphragms 11 of a diaphragm wheel 12 employed as balance diaphragms can be additionally introduced into the beam path of the scan light.

12 Claims, 2 Drawing Sheets

WHITE BALANCING METHOD

BACKGROUND OF THE INVENTION

The invention is in the field of electronic reproduction technology and is directed to a method for white balance in color scanner devices, also referred to as color scanners, for point-by-point and line-by-line scanning of color originals with an optoelectronic color scanner element.

In a color scanner, the scan light coming from the color original is first resolved with dichroitic filters into the color components "red", "green" and "blue" and is supplied to the individual color channels, wherein the three color components of the scan light are then converted with optoelectronic transducers into the color signals for "red", "green" and "blue".

The color signals are further-processed in signal editing stages following the optoelectronic transducers. The signal editing stages comprise a defined signal input range whose corner signal values are referred to as white level and as black level.

Before the beginning of scanning, the density scope of the color original to be scanned is adapted to the defined signal input range of the signal editing stages by a white balance of a color scanner. What is thereby achieved is that the scan light coming from the brightest location of the color original to be scanned, the white point, is converted in the optoelectronic transducer into a color signal value that corresponds to the white level.

Since the scan light coming from the brightest location of the color original varies from color original to color original and the sensitivity of the optoelectronic transducer is not constant over a longer time span, a corresponding white balance is implemented in practice before every scanning of an original, this being complicated since at least three optoelectronic transducers must be balanced.

DE-A-25 45 961 already discloses a method for the automatic white balance of scanners. In a calibration phase, the scanner element of a black/white scanner is positioned to the respective white point of the image original and the scan light coming from the targeted white point is converted into an actual image signal value in the optoelectronic transducer. The actual image signal value is compared in a control unit to a rated image signal value that corresponds to the white level. A control signal changes the sensitivity of the optoelectronic scanner and/or the gain of a following amplifier until the repetitive error is zero. The control signal value required therefor is stored for the duration of the originals' scanning following the calibration phase. For white balance in color scanners, the control unit is expanded to the three color channels.

The known method has the disadvantage that a corresponding white point on the image original to be reproduced must always be targeted with the color scanner element in the white balance, this being time-consuming and, particularly given repetitions of the white balance, imprecise. Added thereto is that a bright image location suitable as a white point is often not present in a chromatic image original.

EP-A 0 281 659 discloses a further method for the white balance of scanners wherein the repeated approach of a white point with the color scanner element on an image original to be reproduced is avoided. For that purpose, a light attenuation factor is determined in the initial white balance by optoelectronic scanning of the white point. Given repetitions of the white balance, the scan light coming from the white point is simulated by the light of the light source attenuated according to the identified light attenuation factor without a repeated scanning of the white point in the image original, whereby the light attenuation is undertaken with a controlled iris diaphragm.

The known method is involved and is based on a color-neutral density simulation, which is not always established in practice, and can therefore occasionally lead to unsatisfactory results. In the known method, further, no density simulation is possible in the scanning of opaque originals since the iris diaphragm is needed for the correct setting of the depth of field.

SUMMARY OF THE INVENTION

It is therefore an object of the present invention to improve a method for the white balance in a color scanner device for the point-by-point and line-by-line, optoelectronic scanning of color originals such that a simple, cost-beneficial and color-neutral simulation of the optical densities of white points in the color originals and, thus, a high reproduction quality is achieved.

According to the present invention, a method is provided for white balance of an opto-electronic color scanner element of a color scanner device for pixel-by-pixel and line-by-line scanning of a color original illuminated by a scan light source for trichromatic splitting of scan light modulated with optical densities of scanned picture elements and limited by a scan diaphragm into color components for each color channel and for conversion of the color components into color signals with a light/voltage transducer unit in every color channel. A white level $U_{WP}$ is predetermined for each color channel. Optical densities $D_{WP}$ of three color components of a white point which is a brightest location of the color original are measured. Rated voltage values $U_{SOLL}$ are calculated that the actual voltage value should reach given an optical density "zero" of the color original for the three color components from the measured optical densities $D_{WP}$ of the white point of the color original and from said predetermined white levels $U_{WP}$ according to the following equation:

$$U_{SOLL}=U_{WP}\times 10 \text{ exp. } [D_{WP}]$$

scan light that represents the optical density "zero" of the color original is simulated with a light source. The scan light representing the optical density "zero" is converted with said light/voltage transducer into color signals as actual voltage values for the individual color components. The actual voltage values are compared to the rated voltage values $U_{SOLL}$. Gains of the light/voltage transducer in the three color channels are set and held constant for a duration of the scanning of the original such that the actual voltage values that are generated given the scan light representing the optical density "zero" of the color original are equal to the calculated rated voltage values $U_{SOLL}$, and as a result thereof, the color signals of the white point of the color original acquired in the later original scanning correspond to the predetermined white levels $U_{WP}$.

DESCRIPTION OF THE PREFERRED EMBODIMENTS

Figure 1:
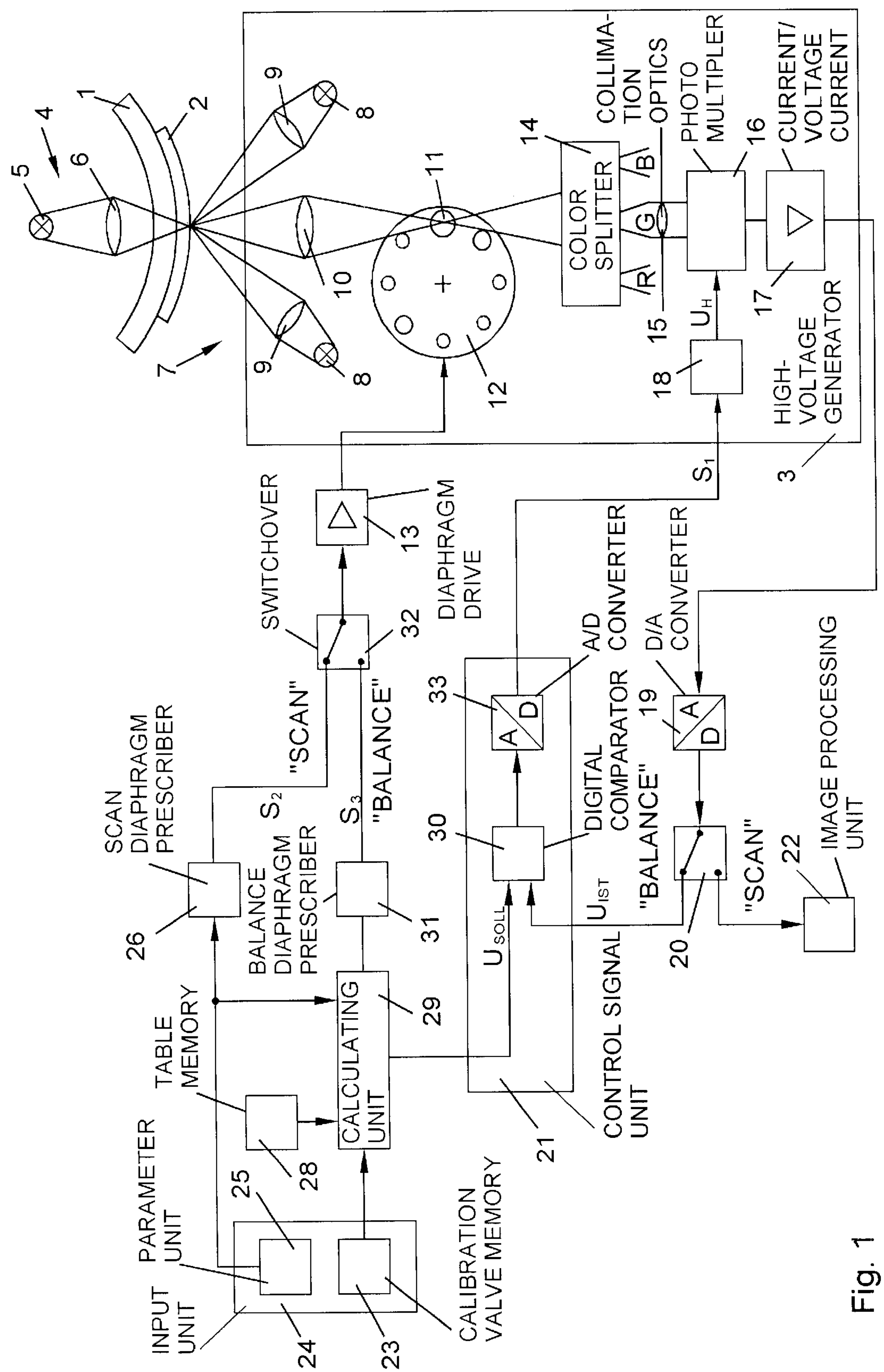
FIG. 1 is a schematic block circuit diagram of a color scanner with a unit for the implementation of a white balance.

FIG. 1 shows a schematic block circuit diagram of a color scanner with a unit for the white balance. A color original 2 in the form of an opaque or transparency color original is arranged on a scanner drum 1 composed of clear glass shown excerpted, this color original 2 being scanned point-by-point and line-by-line by an optoelectronic color scanner element 3.

For the point-by-point illumination of a transparency color original 2, a transparency illumination means 4 with a light source 5 and an optics 6 is provided in the interior of the scanner drum 2. For the point-by-point illumination of an opaque color original 2, an opaque illumination 7 with two light sources 8 and two optics 9 is located in the optoelectronic color scanner element 3.

The scan light allowed to pass by the transparency color original 2 or reflected by the opaque color original 2, which is brightness-modulated according to the brightnesses of the picture elements scanned in the color original 2, proceeds into the optoelectronic color scanner element 3. Thereat, the scan light is focused by a scanner objective 10 onto a scan diaphragm 11 of a diaphragm wheel 12. The diaphragm wheel comprises a plurality of scan diaphragms 11 with different diameters. The diaphragm wheel 12 is seated capable of rotation and is positioned by a diaphragm drive 13 such that a scan diaphragm 11 of the diaphragm wheel 12 respectively selected according to the desired scanning fineness lies in the beam path. A color splitter 14 is arranged behind the diaphragm wheel 12, this resolving the scan light into the three color components "red" R, "green" G and "blue" B and supplying it to three separate color channels "red", "green" and "blue". For example, the color splitter is composed of color-selective mirrors. In the three color channels "red", "green" and "blue", whereof only the color channel "green" is shown, the color components "red", "green" and "blue" are converted into three analog color signals R, G, B.

In the illustrated "green" color channel, the corresponding color component is conducted through a collimation optics 15 onto a light/voltage transducer that is composed of a photomultiplier 16 with a following current/voltage converter 17 in the exemplary embodiment. The current/voltage converter 17 converts the output current of the photomultiplier 16 into an analog color signal G. The photomultiplier 16 has a modulation range from zero up to a maximum limit value $U_{GR}$. The high-voltage $U_H$ required for the operation of the photomultiplier 16 is generated in a high-voltage generator 18 that is controlled by a control signal $S_1$. The analog color signal G generated in the current/voltage converter 17 is converted into digital color values G in an AND converter 19.

The AND converter 170 is followed by a switchover 20 having the switch positions "balance" and "scan". During a white balance of the color scanner, the switchover 20 is in the switch position "balance" wherein a color value G representative for the white balance is supplied to a control signal unit 21 as voltage actual value $U_{IST}$. During the originals' scanning, the switchover 20 is in the switch position "scan" wherein the color values G of the color original 2 are supplied for further-processing to an image processing unit 22.

The "red" and "blue" color channels that are not shown are identically constructed and respectively comprise a photomultiplier, a current/voltage converter, an AND converter, a switchover and a control signal unit. The color values R, B generated in the "red" and "blue" color channels are likewise conducted to the image processing unit 22 for further processing.

The logarithmized color values R, G, B represent the optical densities of the color components of the picture elements scanned in the color original 2.

The white balance is implemented before the originals' scanning, it being thereby achieved that the color scanner element 3 generates color values R, G, B during the originals' scanning when scanning the white point of the color original 2 that correspond to the white level predetermined for the individual color channels or to a common white level. In the white balance, the optical densities $D_{WP}$ of the white point are simulated without having to approach the true white point in the color original with the color scanner element 3 and scanning it during the white balance. Inventively, the simulation of the optical density $D_{WP}$ of the white point of the color original 2 ensues with a corresponding setting of the gain of the light/voltage transducer 16, 17 ("electrical density simulation") and/or by a corresponding attenuation of the scan light simulated in the illumination 4, 7 with one of the scan diaphragms 11 of the diaphragm wheel 12 employed as a balance diaphragm "optical density simulation".

The inventive method for white balance is explained in greater detail below on the basis of the method steps A, B and C for one of the three color channels.

In the first method step A of the white balance, a rated voltage value $U_{SOLL}$ for the corresponding color channel is determined from the previously determined optical density $D_{WP}$ of the white point of the color original 2 and the predetermined white level $U_{WP}$ for an "electrical density simulation" by setting the gain of the individual light/voltage transducer means 16, 17. As warranted, one of the existing scan diaphragms 11 of the diaphragm wheel 12 is selected for an "optical density simulation" by light attenuation of the scan light simulated by the opaque illumination unit 4 and is positioned in the beam path of the color scanner element 3 as a balance diaphragm for the duration of the white balance.

Before the white balance, the optical densities $D_{WP}$ of the white point of a color original 2 to be scanned are identified by a manual densimetric measurement of the white point in the color original 2 or by an automatic analysis of the image scope of the color original 2, for example according to DE-A-43 09 879. The identified optical densities $D_{WP}$ of the white point, also called calibration values, are stored in a calibration value memory 23 of an input unit 24. The optical densities of the white points of a plurality of color originals that are to be successively scanned can be stored in callable fashion in the calibration value memory 23. The input unit 24 also contains a parameter memory 25 in which diaphragm parameters for the scan diaphragms 11 of the diaphragm wheel 12 are stored. The diaphragm parameters of the scan diaphragm 11 of the diaphragm wheel 12 to be employed in the scanning of the color original 2 are converted in a scan diaphragm prescriber 26 into a corresponding control signal $S_2$ that is supplied to the diaphragm drive 13 via a switchover (32) in the switch position "scan". The diaphragm drive 13 then positions the selected scan diaphragm 11 of the diaphragm wheel 12 in the beam path of the color scanner element 3 for the duration of the scan event.

In the form of a diaphragm density table, three previously determined, relative diaphragm densities $D_{BL}$ for the three color channels "red", "green" and "blue" are indicated in a table memory 28 for each scan diaphragm 11 of the diaphragm wheel 12. The diaphragm density $D_{BL}$ of a scan diaphragm 11 is a respective criterion for the light attenuation achieved with the corresponding scan diaphragm 11.

Before the white balance, the relative diaphragm densities $D_{BL}$ of the diaphragm density table are determined from the relationship of the diaphragm densities of the various scan diaphragms 11 of the diaphragm wheel 12 to the diaphragm density of a scan diaphragm 11 selected as a reference diaphragm. For determining the diaphragm densities, the voltages achieved at the individual scan diaphragms 11 of the diaphragm wheel 12 with a gain of the photomultiplier 16 that is set low via the high-voltage $U_H$ is first measured at the output of the current/voltage converter 17, and that scan diaphragm 11 that yields the higher voltage is defined as a reference diaphragm. The scan diaphragm 11 determined as a reference diaphragm is brought into the beam path of the color scanner element 3. As described later in method step C, a device balancing is then undertaken with the reference diaphragm in that the gain of the photomultiplier 16 is set with a control procedure such that the output voltage corresponds to a predetermined rated value. The diaphragm density values are then measured as logarithmized output voltages with this setting for all scan diaphragms 11 of the diaphragm wheel 12 and are placed into relationship with the diaphragm density of the reference diaphragm in order to obtain the relative diaphragm densities $D_{BL}$ for the diaphragm density table.

A high balancing precision derives by employing relative diaphragm densities instead of absolute diaphragm densities. Possible inhomogeneities of the photo cathode of the photomultiplier and of the scan illumination as well as other disturbing effects that would lead to color casts or an imprecise density simulation are advantageously co-acquired.

An example of a diaphragm density table is given below:

| Diaphragm identification number | rel. diaphragm density $D_{BL}$ for "red" | rel. diaphragm density $D_{BL}$ for "green" | rel. diaphragm density $D_{BL}$ for "blue" |
|---|---|---|---|
| 1 | 0.7806 | 0.7826 | 0.7810 |
| 2 | 0.6095 | 0.6104 | 0.6100 |
| 3 | 0.4928 | 0.4935 | 0.4923 |
| 4 | 0.3081 | 0.3088 | 0.3085 |
| 5 Reference diaphragm | 0 | 0 | 0 |
| 6 | 0.1337 | 0.1335 | 0.1339 |
| 7 | 0.2192 | 0.2251 | 0.2602 |

The current optical density $D_{WP}$ of the white point of the color original 2 for the corresponding color channel is transferred from the calibration value memory 23 of the input unit 24 into a calculating unit 29. The diaphragm parameters stored in the parameter memory 25 of the input unit 24 and the relative diaphragm densities $D_{BL}$ of the various scan diaphragms 11 of the diaphragm wheel deposited in the table memory 28 are also supplied to the calculating unit 29.

The rated voltage value $U_{SOLL}$ for the corresponding color channel is determined in the calculating unit 29 for the "electrical density simulation", this being supplied to a digital comparator 30 in the control unit 21. At the same time, the balance diaphragm required for the light attenuation for the "optical density simulation" is determined in the calculating unit 28. The diaphragm identification number of the scan diaphragm 11 of the diaphragm wheel 12 identified as the balance diaphragm is communicated to a balance diaphragm prescriber 31 that converts the diaphragm identification number into a corresponding control signal $S_3$ The control signal $S_3$ proceeds via the switchover 32 in the switch position "balance" to the diaphragm drive 13 that positions the corresponding scan diaphragm 11 of the diaphragm wheel 12 in the beam path of the color scanner element 3 as a balance diaphragm for the duration of the white balance.

The following calculations are implemented in the calculating unit 29.

The optical density value $D_{WP}$ of the white point of the color original 2 for the corresponding color channel is first compared to a limit density $D_{GR}$. The limit density $D_{GR}$ defines the maximum optical density $D_{WP}$ of the white point for which a purely "electrical density simulation" can be implemented by setting the gain of the photomultiplier 15. The limit density $D_{GR}$ derives from the logarithmic relationship of the maximum voltage value $U_{GR}$ of the modulation range of the photomultiplier 15 to the defined white level $U_{WP}$ according to Equation 1.

$$D_{GR}=\log U_{GR}/U_{WP} \qquad 1$$

with $D_{GR}$=limit density of a color channel $U_{GR}$=maximum voltage value of the modulation range in the color channel, and $U_{WP}$=white level of the color channel.

The rated voltage value $U_{SOLL}$ for the corresponding color channel in an "electrical density simulation" derives according to the general Equation 2.

$$U_{SOLL}=U_{WP}\times 10\ \exp\ [D_{WP}-(D_{AB}-D_{SC})] \qquad 2$$

with $U_{SOLL}$=rated voltage value for a color channel $U_{WP}$=white level of the color channel $D_{WP}$=optical density of the white point for the color channel $D_{AB}$=balance diaphragm density for the color channel and $D_{SC}$=scan diaphragm density.

An exclusive "electrical density simulation" is implemented when the optical density value $D_{WP}$ of the white point of the color original 2 is lower than the limit density $D_{GR}$. An additional "optical density simulation" is omitted. The balance diaphragm for the white balance corresponds to the scan diaphragm for the scan event. $D_{AB}=D_{SC}$ thus applies, and Equation 2 is simplified to Equation 3.

$$U_{SOLL}=U_{WP}\times 10\ \exp\ D_{WP}\ \text{for}\ D_{WP}<D_{GR} \qquad 3$$

In a first example, let the maximum voltage of the modulation range amount to $U_{GR}$=10 V, the white level to $U_{WP}$=6 V and the optical density of the white point of a color original to $D_{WP}$=0.15.

According to Equation 1, the limit density is $D_{GR}=\log U_{GR}/U_{WP}=\log 10/6=0.22$ and, at $D_{WP}$=0.15, the optical density of the white point is lower than the limit density $D_{GR}$=0.22.

According to Equation 3, the rated voltage value required in this case for the "electrical density simulation" derives as $U_{SOLL}=U_{WP}\times 10\ \exp\ D_{WP}=6\times 10\ \exp\ 0.15$ =8.475 V.

When the optical density value $D_{WP}$ of the white point is greater than the limit density $D_{GR}$, an additional "optical density simulation" for the optical density $D_{WP}$ of the white point of the color original 2 must be implemented in addition to the "electrical density simulation".

The limit density $D_{GR}$ for the "electrical density simulation" is all the lower the closer the white level $U_{WP}$ lies to the maximum voltage value $U_{max}$ of the modulation range, and the proportion of the "optical density simulation" increases until only the "optical density simulation" is implemented given equality of white level $U_{WP}$ and maximum voltage $U_{GR}$.

The balance density $D_O$ for the "optical density simulation" results according to Equation 3 from the difference between the optical density $D_{WP}$ of the white point and the limit density $D_{GR}$.

$$D_O=D_{WP}-D_{GR} \quad 3$$

Those balance diaphragms whose greater, corresponding, relative diaphragm densities $D_{BL}$ respectively exhibit at least a density distance from the size of the balance density $D_O$ from the diaphragm density $D_{BL}$ of the current scan diaphragm 11 are respectively selected for the individual color channels "red", "green" and "blue" from the diaphragm density table deposited in the table memory 28.

Since the required relative diaphragm densities $D_{BL}$ for the three color channels are not always present in the diaphragm density table, an exact matching is undertaken via corrected rated voltage value $U_{SOLL}$ for the three color channels, these being calculated according to Equation 4.

$$U_{SOLL}=U_{WP}\times 10 \exp\,[D_{WP}-(D_{AB}-D_{SC})] \text{ for } D_{WP}>D_{GR} \quad 4$$

with $U_{SOLL}$=rated voltage value for a color channel $U_{WP}$=white level of the color channel $D_{WP}$=optical density of the white point for the color channel $D_{AB}$=balance diaphragm density of the color channel and $D_{SC}$=scan diaphragm density.

The rated voltage value $U_{SOLL}$ calculated for the "green" color channel is in turn forwarded to the digital comparator 30 in the control unit 21, whereas the scan diaphragm 11 to be employed as a balance diaphragm is pivoted via the balance diaphragm prescriber 31 into the beam path of the color scanner element 3.

In a second example, let the maximum voltage of the modulation range again amount to $U_{GR}$ and the white level to $U_{WP}$=6 V. Compared to the first example, by contrast, let the optical density of the white point of a color original be $D_{WP}$=0.35 and, thus, greater than the limit density $D_{GR}$=0.22. As a current scan diaphragm, the scan diaphragm provided with the identification number "6" should be employed with $D_{BL}$=0.1337 for the "red" color channel", $D_{BL}$=0.1335 for the "green" color channel and $D_{BL}$=0.1339 for the "blue" color channel.

According to Equation 3, the balance density is $D_O$=0.35−0.22=0.13. In this case, the scan diaphragm provided with the identification number "4" with $D_{BL}$=0.3081 for the "red" color channel, $D_{BL}$=0.3088 for the "green" color channel and $D_{BL}$=0.3085 for the "blue" color channel is selected as balance diaphragm from the diaphragm density table, since the relative diaphragm densities $D_{BL}$ of the balance diaphragm exhibit a minimal density distance of $D_O$=0.13 from the scan diaphragm.

The rated voltage values $U_{SOLL}$ for the three color channels then derive according to Equation 4 with the diaphragm densities $D_{BL}$ of the balance diaphragm.

$U_{SOLL}$=6×10 exp.[0.35−(0.3081−0.1337)]=8.99 for the "red" color channel $U_{SOLL}$=6×10 exp.[0.35−(0.3088−0.1335)]=8.97 for the "green" color channel $U_{SOLL}$=6×10 exp.[0.35−(0.3085−0.1339)]=8.98 for the "blue" color channel In the second method step B of the white balance, the color scanner element 3 is manually positioned in such a way relative to the scanner drum 1 that it scans a location outside the color original 2. In this position, the scan light simulated by the light source 5 proceeds through the clear glass of the scanner drum 1 directly into the color scanner element 3, whereby the scan light simulated by the light source 5 represents an optical density of zero.

When no "optical density simulation" occurs, the scan light simulated by the light source (5) proceeds unattenuated onto the photomultiplier 15 through the scan diaphragm 11 provided for the scan event. When, by contrast, an "optical density simulation" occurs, the simulated scan light is first attenuated to the required optical density by a balance diaphragm, which is smaller than the corresponding scan diaphragm, and the attenuated scan light proceeds onto the photomultiplier 15.

In the third method step C of the white balance, the gain of the photomultiplier 16 is set via the control signal $S_1$ and the high-voltage $U_H$ on the basis of the unattenuated light of the light source 5 or, potentially, the light of the light source 5 attenuated by a balance diaphragm, being set such that the amplitude of the color signal corresponds to the white level $U_{WP}$ in the later scanning of the white point of the color original 2.

For setting the gain of the photomultiplier 16, the actual color signal value $U_{IST}$ is supplied to a first input of the digital comparator 30 in the control signal unit 21. The second input of the digital comparator 30 is charged with the rated voltage value $U_{SOLL}$ calculated in method step A. The digital comparison value formed by the comparison of the actual voltage value $U_{IST}$ and rated voltage value $U_{SOLL}$ is converted in a following D/A converter 33 into the analog control signal $S_1$ for the high-voltage generator 18. Dependent on the operational sign of the control signal $S_1$, the gain of the photomultiplier 16 is increased or lowered via the high-voltage $U_H$ until the actual voltage value $U_{IST}$ is equal to the rated voltage value $U_{SOLL}$ given the control signal $S_1$=0, the white balance being therewith ended.

The gain of the photomultiplier 16 achieved given the control signal $S_1$=0 is kept constant for the duration of the scanning of the color original 2 implemented after the white balance by storing a corresponding high-voltage value in the high-voltage generator 18. Moreover, the scan diaphragm 11 of the diaphragm wheel 12 corresponding to the desired scanning fineness is swiveled into the beam path.

Figure 2:
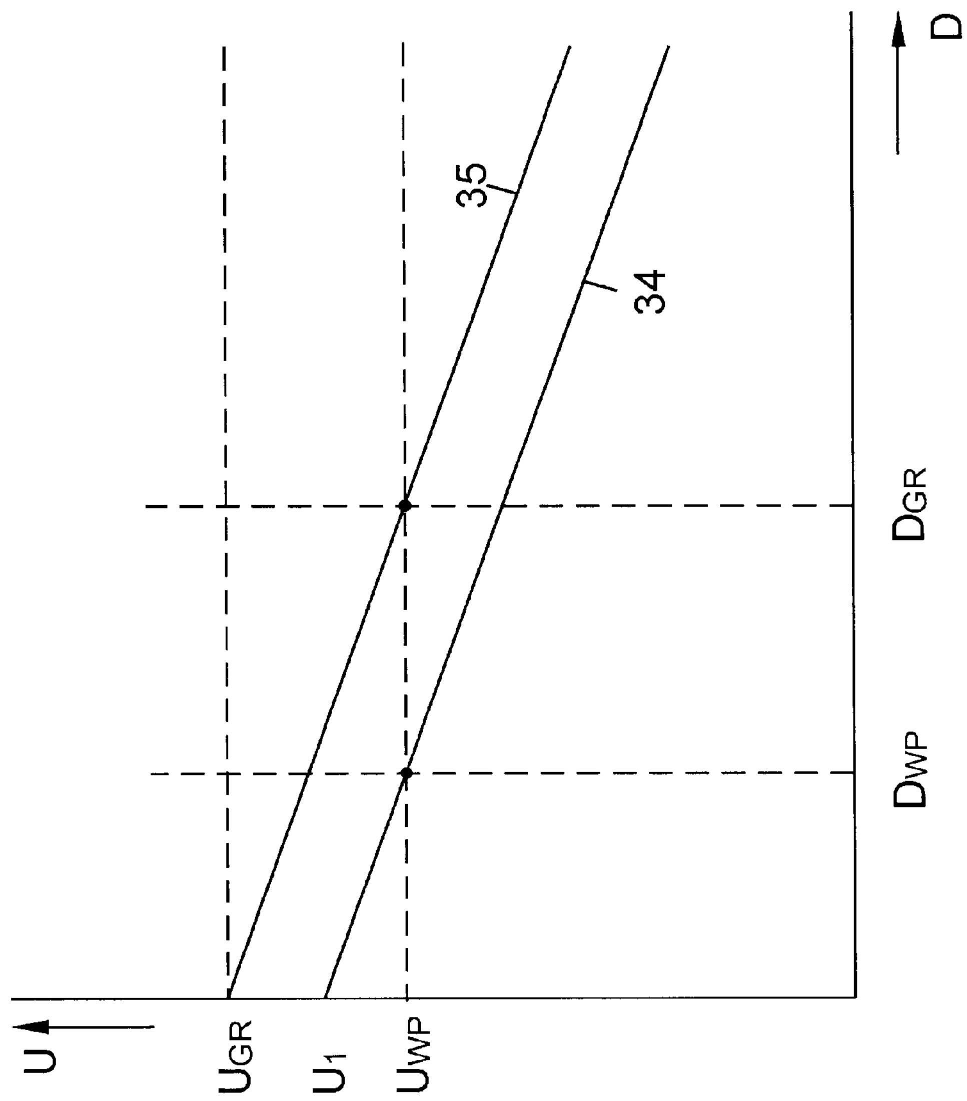
FIG. 2 is a graphic illustration for explaining the white balance.

FIG. 2 shows a graphic illustration for explaining the "electrical density simulation". Characteristic density values D such as the optical density $D_{WP}$ of the white point of the color original and the limit density $D_{GR}$ for an "electrical density simulation" are entered on the abscissa. Characteristic voltage values U at the output of the photomultiplier such as the maximum voltage $U_{GR}$ of the modulation range and the white level $U_{WP}$ are entered on the ordinate. The density range from $D_O$=0 through $D_O$=$D_{GR}$ characterizes the range in which an "electrical density simulation" occurs. The limit density $D_{GR}$ for an "electrical density simulation" is all the lower the closer the white level $U_{WP}$ lies to the maximum voltage $U_{max}$ of the modulation range, until an "electrical density simulation" is no longer possible given equality of white level $U_{WP}$ and maximum voltage $U_{max}$. When balancing to a voltage $U_1$ is carried out on the clear glass of the scanner drum ($D_O$=0) in the white balance, then, as desired, a voltage that corresponds to the white level $U_{WP}$ just derives due to the curve of the balance straightline 34 when scanning the white point of the color original 2 with the optical density $D_{WP}$. When balancing is carried out to the maximum voltage $U_{GR}$ of the modulation range in the white balance, then the white level $U_{WP}$ can just still be achieved given an optical density $D_{WP}$ of the white point that corresponds to the limit density $D_{GR}$, corresponding to the curve of the balance straightline 35.

Although various minor changes and modifications might be proposed by those skilled in the art, it will be understood that our wish is to include within the claims of the patent warranted hereon all such changes and modifications as reasonably come within our contribution to the art.

What is claimed is:

1. A method for white balance of an optoelectronic color scanner element of a color scanner device for pixel-by-pixel and line-by-line scanning of a color original illuminated by a scan light source for trichromatic splitting of scan light modulated with optical densities of scanned picture elements and limited by a scan diaphragm into color components for each color channel and for conversion of the color components into color signals with a light/voltage transducer in every color channel, comprising the steps of:

predetermining a white level $U_{WP}$ for each color channel;

measuring optical densities $D_{WP}$ of three color components of a white point of the color original which is a brightest location;

calculating rated voltage values $U_{SOLL}$ that the actual voltage values should reach given optical density "zero" of the color original for the three color components from the measured optical densities $D_{WP}$ of the white point of the color original and from said predetermined white levels according to the equation:

$$U_{SOLL}=U_{WP}\times 10 \text{ exp. } [D_{WP}];$$

simulating with a light source scan light that represents the optical density "zero" of the color original;

converting the scan light representing the optical density "zero" with said light/voltage transducer into color signals as actual voltage values for the individual color components;

comparing the actual voltage values to the rated voltage values $U_{SOLL}$; and setting and holding constant gains of the light/voltage transducer in the three color channels for a duration of the scanning of the original such that the actual voltage values that are generated given the scan light representing the optical density "zero" of the color original are equal to the calculated rated voltage values $U_{SOLL}$, and as a result thereof, the color signals of the white point of the color original acquired in the later original scanning correspond to the predetermined white levels $U_{WP}$.

2. The method according to claim 1 wherein the optical densities $D_{WP}$ of the white point of the color original are measured by scanning the brightest image location in the color original with a color scanner element of the color scanner.

3. The method according to claim 1 wherein:

the color original is scanned point-by-point and line-by-line with a color scanner element of the color scanner;

the color signals thereby acquired are digitalized and the digitalized color values are stored; and the optical densities $D_{WP}$ of the white point of the color original are determined by an original analysis on the basis of the stored digital color values.

4. The method according to claim 1, wherein the scan light with the optical density "zero" of the color original is generated by the scan light source of the color scanner.

5. The method according to claim 1 wherein:

for a plurality of balance diaphragms with different diaphragm diameters, a respective diaphragm density is determined for each color channel as a criterion for attenuation of the scan light that can be achieved with the balance diaphragm, and the diaphragm densities are allocated to the balance diaphragms in a diaphragm density table;

the measured optical densities $D_{WP}$ of the white point of the color original are compared to previously determined limit densities;

when the optical densities $D_{WP}$ of the white point are greater than the limit densities, corresponding optical balance densities are determined as a difference between the optical densities $D_{WP}$ of the white point and the limit densities;

a balance diaphragm is selected from the diaphragm density table, the diaphragm density comprising at least a defined density distance from the diaphragm density of the scan diaphragm employed in the original scanning, and the selected balance diaphragm is introduced into the beam path of the scan light;

the scan light representing the optical density "zero" is attenuated at least to the optical balance densities by the selected balance diaphragm; and the white balance is implemented by setting the gain of the light/voltage transducer on the basis of the attenuated scan light.

6. The method according to claim 5, wherein the balance diaphragm from the diaphragm density table is selected whose greatest diaphragm density at least exhibits a density distance from the scan diaphragm employed in the original scanning on the order of the balance destiny.

7. The method according to claim 5 wherein for enhancing precision of the white balance, an imprecise density matching of the balance diaphragms is compensated by corrected rated voltage values $U_{SOLL}$;

the corrected rated voltage values $U_{soll}$ for each color channel are calculated from the predetermined white level $U_{WP}$, the optical density $D_{WP}$ of the white point, the diaphragm density $D_{AB}$ of the selected balance diaphragm and the diaphragm density $D_{SC}$ of the scan diaphragm according to the following equation:

$$U_{SOLL}=U_{WP}\times 10 \text{ exp } [D_{WP}-(D_{AB}-D_{SC})].$$

8. The method according to claim 5 wherein the limit densities respectively correspond to a logarithmized quotient of a maximum voltage of a modulation range of the light/voltage transducer and the corresponding white level $U_{WP}$.

9. The method according to claim 5 wherein the scan diaphragms of a diaphragm wheel of the color scanner are employed as balance diaphragms.

10. The method according to claim 5 wherein the diaphragm density table contains relative diaphragm densities that are respectively calculated from a relationship of absolute diaphragm densities of corresponding balance diaphragms to diaphragm density of a reference diaphragm selected from the plurality of balance diaphragms.

11. The method according to claim 10 wherein for determining the relative diaphragm densities:

the balance diaphragms are successively brought into the beam path of the scan light;

output voltages of the light/voltage transducer are measured given minimally set gain of one of the light/voltage transducers;

the balance diaphragm with a maximum output voltage is selected as a reference diaphragm and introduced into a beam path of the simulated scan light;

a gain of the light/voltage transducer is set such that the output voltage given the reference diaphragm corresponded to a predetermined rated value;

the balance diaphragms are placed anew into the beam path of the scan light and the output voltages are measured anew with the set gain, whereby the logarithmized output voltages are the absolute diaphragm densities of the balance diaphragms or of the reference diaphragm; and the relative diaphragm densities are respectively calculated from a relationship of the absolute diaphragm densities of the corresponding balance diaphragms to the absolute diaphragm density of the reference diaphragm.

12. A method for white balance of an optoelectronic color scanner element of a color scanner device for scanning a color original illuminated by a scan light source for trichromatic splitting of scan light modulated with optical densities of scanned picture elements and limited by a scan diaphragm into color components for each color channel and for conversion of the color components into color signals with a transducer in every color channel, comprising the steps of:

predetermining a white level $U_{WP}$ for each color channel;

measuring optical densities $D_{WP}$ of three color components of a white point of the color original which is a brightest location;

calculating rated voltage values $U_{SOLL}$ that the actual voltage values should reach given optical density "zero" of the color original for the three color components from the measured optical densities $D_{WP}$ of the white point of the color original and from said predetermined white levels according to the equation:

$$U_{SOLL}=U_{WP}\times 10\ \exp.\ [D_{WP}];$$

simulating with a light source scan light that represents the optical density "zero" of the color original;

converting the scan light representing the optical density "zero" with said light/voltage transducer into color signals as actual voltage values for the individual color components;

comparing the actual voltage values to the rated voltage values $U_{SOLL}$; and setting gains of the light/voltage transducer in the three color channels for a duration of the scanning of the original such that the actual voltage values that are generated given the scan light representing the optical density "zero" of the color original are equal to the calculated rated voltage values $U_{SOLL}$, and as a result thereof, the color signals of the white point of the color original acquired in the later original scanning correspond to the predetermined white levels.

* * * * *